US00RE47880E

(19) United States
(12) Reissued Patent
Li

(10) Patent Number: US RE47,880 E
(45) Date of Reissued Patent: Mar. 3, 2020

(54) BUMPER/GRILLE GUARD FOR VEHICLES

(71) Applicant: Tyger Auto Inc., Bellingham, WA (US)

(72) Inventor: Ming Li, Coquitlam (CA)

(73) Assignee: M2 Distribution Ltd., Port Coquitlam (CA)

(21) Appl. No.: 29/696,649

(22) Filed: Jun. 28, 2019

Related U.S. Patent Documents

Reissue of:
(64) Patent No.: Des. 810,639
Issued: Feb. 20, 2018
Appl. No.: 29/580,905
Filed: Oct. 13, 2016

(51) LOC (12) Cl. ..... 12-16
(52) U.S. Cl.
USPC ..... D12/171
(58) Field of Classification Search
USPC ..... D12/86–92, 163–172
CPC ..... B62D 25/0845; B60R 19/18; B60R 19/24; B60R 19/44; B60R 19/48; B60R 19/56; B60R 2019/527; B60R 2019/1886
See application file for complete search history.

(56) References Cited

U.S. PATENT DOCUMENTS

D333,457 S * 2/1993 La Foe ..... D12/171
D361,316 S * 8/1995 Orth, Sr. ..... D12/171
D383,719 S * 9/1997 Thorne ..... D12/171
D384,625 S * 10/1997 Thorne ..... D12/171
D388,042 S * 12/1997 Thorne ..... D12/171
D396,678 S * 8/1998 Shklyaver ..... D12/171
D410,879 S * 6/1999 Orth, Sr. ..... D12/171
D416,219 S * 11/1999 Waagenaar ..... D12/171
D420,962 S * 2/2000 Chevalier ..... D12/171
D422,952 S * 4/2000 Waagenaar ..... D12/171
D422,953 S * 4/2000 Waagenaar ..... D12/171
D425,462 S * 5/2000 Ujiie ..... D12/171
D440,530 S * 4/2001 Geisler ..... D12/171
D483,708 S * 12/2003 Roehmer ..... D12/171
D507,999 S * 8/2005 Potak ..... D12/171
(Continued)

*Primary Examiner* — Darlington Ly
(74) *Attorney, Agent, or Firm* — Eric J. Sosenko; Jonathan P. O'Brien; Honigman LLP

(57) CLAIM

The ornamental design for a bumper/grille guard for vehicles, as shown and described.

DESCRIPTION

FIG. 1 is a top, front, and right side perspective view of a bumper/grille guard for vehicles showing my new design;
FIG. 2 is a front elevation view thereof;
FIG. 3 is a left side elevation view thereof;
FIG. 4 is a right side elevation view thereof;
FIG. 5 is a top plan view thereof;
FIG. 6 is a bottom plan view thereof; and[.]
FIG. 7 is a rear elevation view thereof.
*FIG. 8 is a top, front, and right side perspective view of a bumper/grille guard for vehicles showing my new design in accordance to an alternate embodiment;*
*FIG. 9 is a front elevation view thereof;*
*FIG. 10 is a left elevation view thereof;*
*FIG. 11 is a right side elevation view thereof;*
*FIG. 12 is a top plan view thereof;*
*FIG. 13 is a bottom plan view thereof; and,*
*FIG. 14 is a rear elevation view thereof.*
The broken lines shown *in the figures* illustrate portions of the bumper/grille guard for vehicles that form no part of the claimed design.

1 Claim, 10 Drawing Sheets

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D517,963 | S | * | 3/2006 | Potak | D12/171 |
| D523,383 | S | * | 6/2006 | Fox | D12/171 |
| D527,696 | S | * | 9/2006 | Ichikawa | D12/171 |
| D528,481 | S | * | 9/2006 | Taveras | D12/171 |
| D532,348 | S | * | 11/2006 | Kudo | D12/171 |
| D535,923 | S | * | 1/2007 | Katoh | D12/171 |
| D551,138 | S | * | 9/2007 | Storer | D12/171 |
| D572,180 | S | * | 7/2008 | Storer | D12/171 |
| D577,319 | S | * | 9/2008 | Storer | D12/171 |
| D580,322 | S | * | 11/2008 | Schroeder | D12/107 |
| D606,913 | S | * | 12/2009 | Robertson | D12/171 |
| D614,095 | S | * | 4/2010 | Fretz | D12/171 |
| D614,096 | S | * | 4/2010 | Fretz | D12/171 |
| D618,600 | S | * | 6/2010 | Lorenzo | D12/171 |
| D619,060 | S | * | 7/2010 | Lorenzo | D12/171 |
| D619,061 | S | * | 7/2010 | Lorenzo | D12/171 |
| D626,474 | S | * | 11/2010 | Lorenzo | D12/171 |
| D636,305 | S | * | 4/2011 | Alvarez | D12/171 |
| D640,618 | S | * | 6/2011 | Lorenzo | B60R 19/44 D12/171 |
| D689,417 | S | * | 9/2013 | Shelters | D12/171 |
| D724,505 | S | * | 3/2015 | Schroeder | D12/171 |
| D726,605 | S | * | 4/2015 | Schroeder | D12/171 |
| D743,856 | S | * | 11/2015 | Ma | D12/171 |
| D755,094 | S | * | 5/2016 | Lanini | D12/171 |
| D777,618 | S | * | 1/2017 | Setina | D12/171 |

* cited by examiner

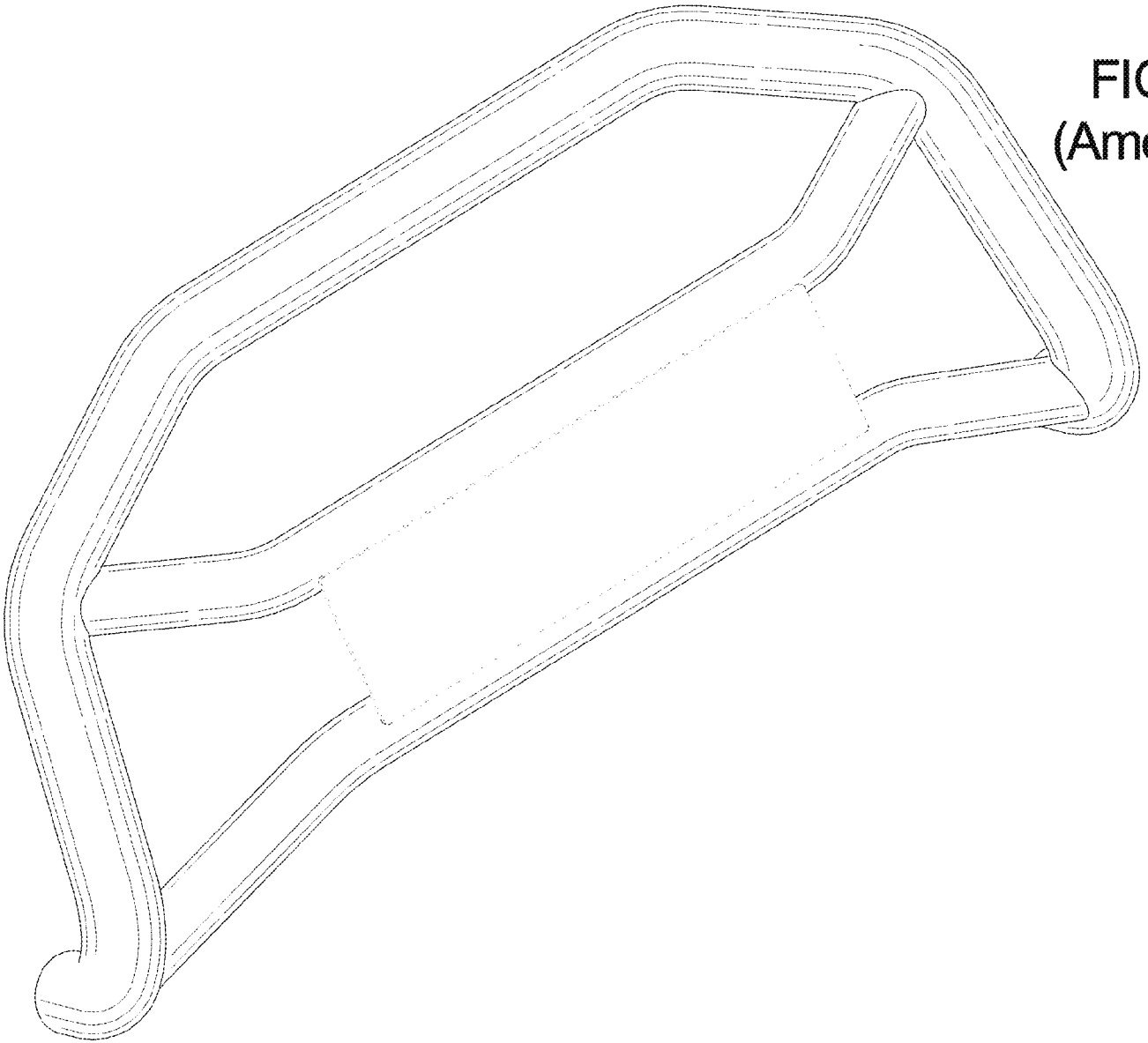
FIG. 1
(Amended)

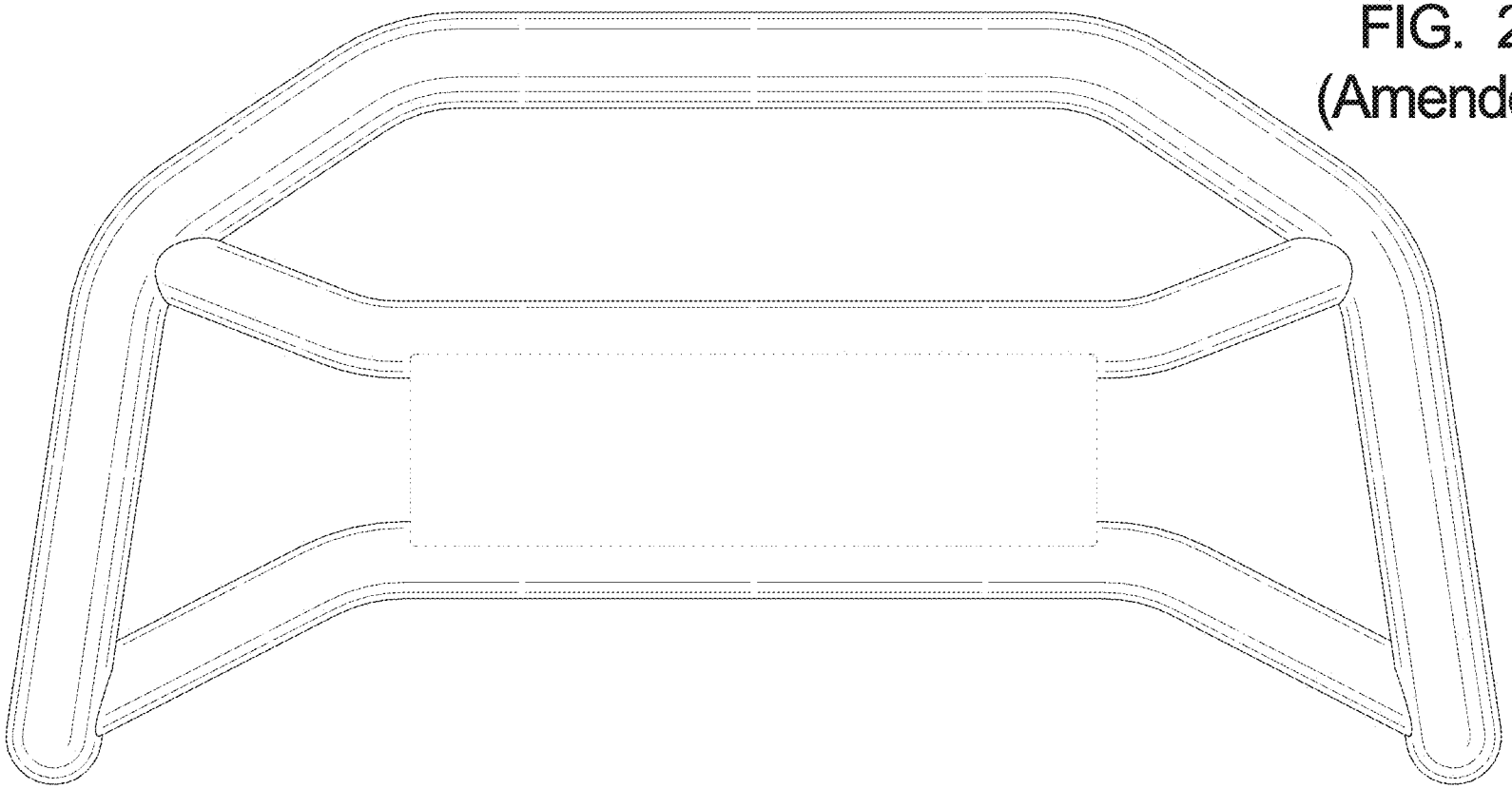
FIG. 2
(Amended)

FIG. 4
(Amended)
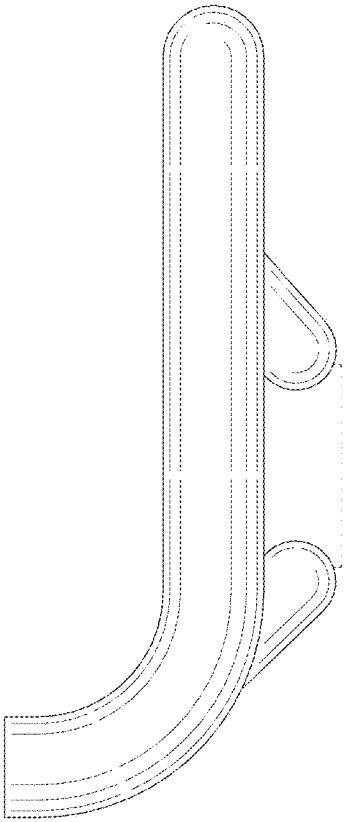
FIG. 3
(Amended)
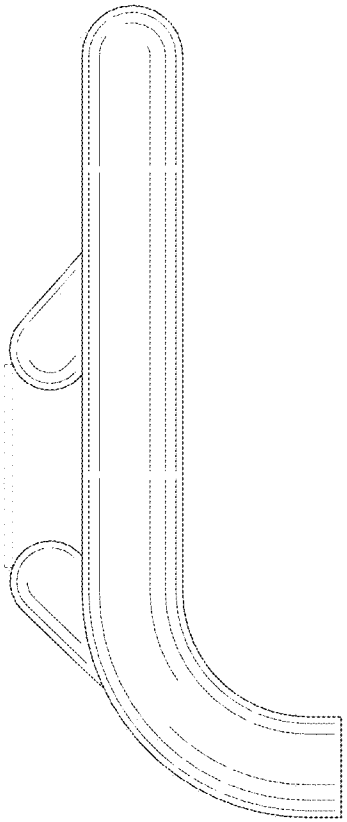

FIG. 5
(Amended)
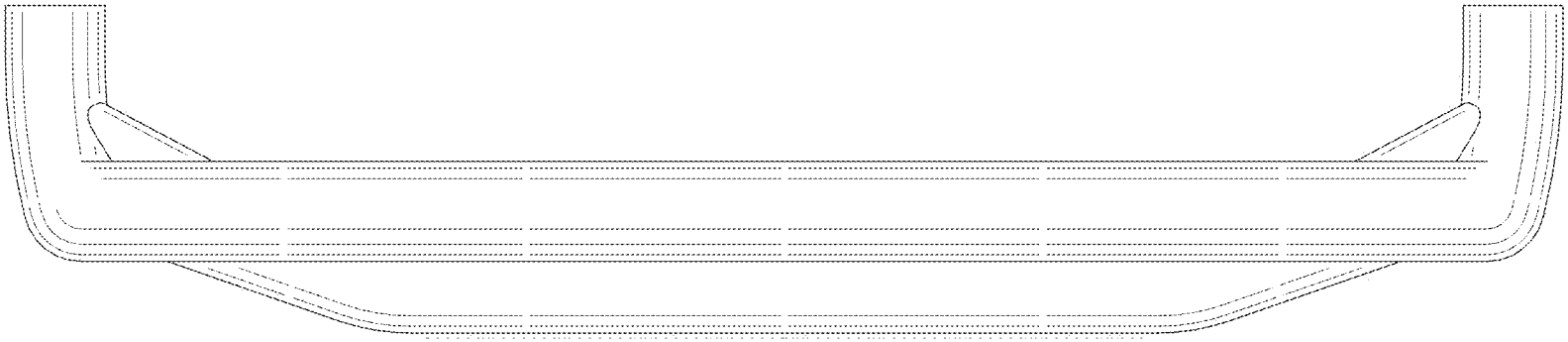
FIG. 6
(Amended)
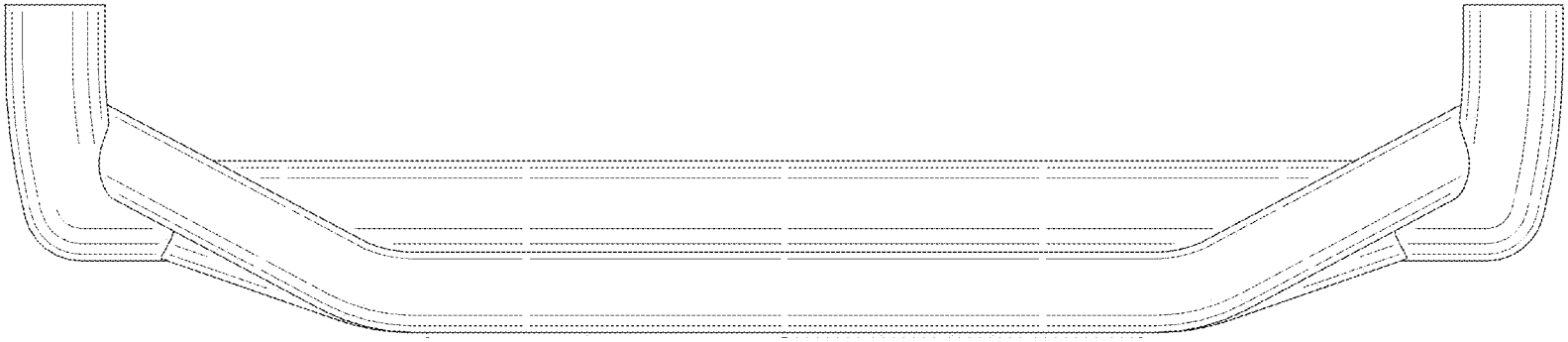

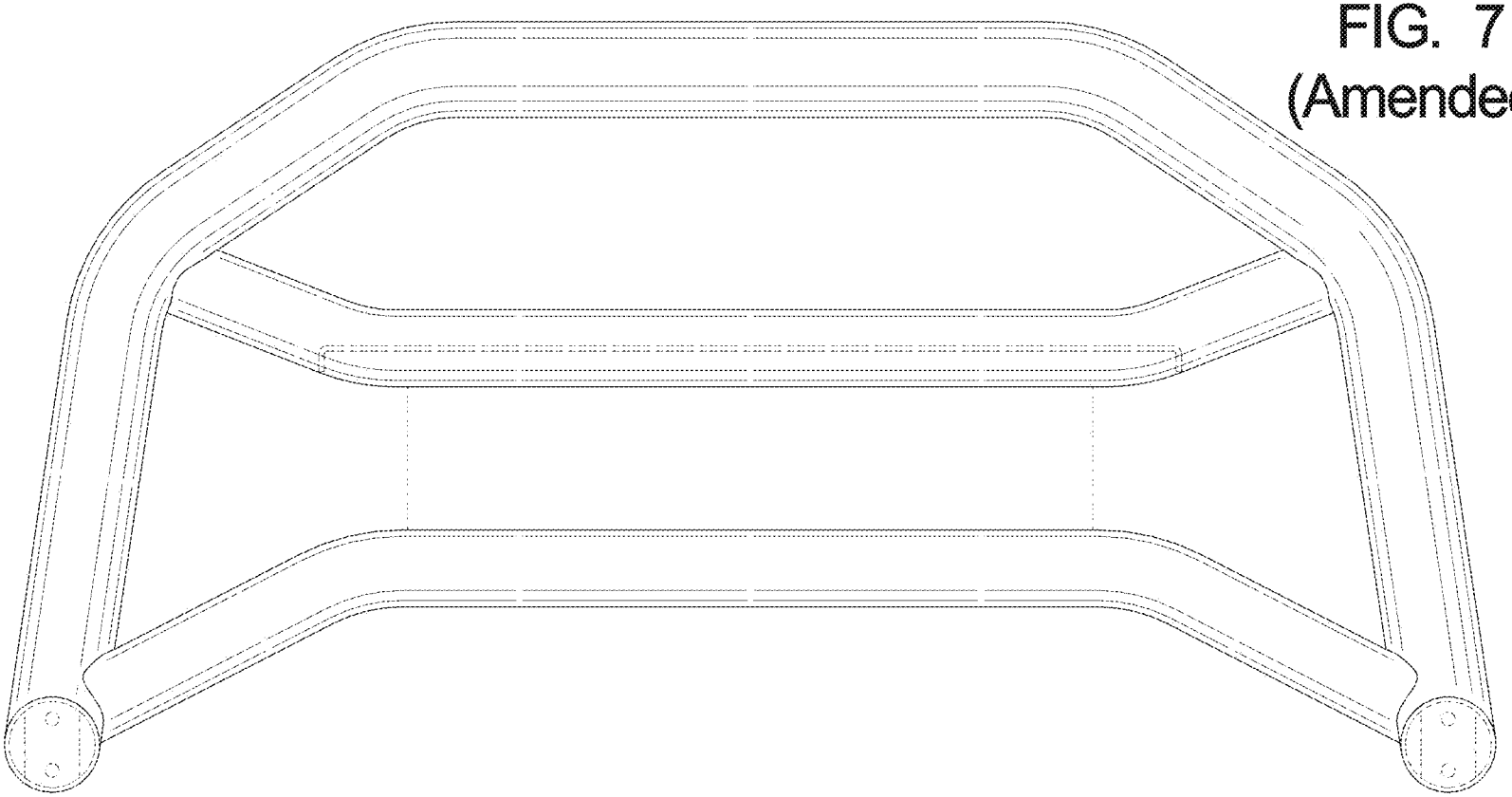
FIG. 7
(Amended)

FIG. 8
(New)
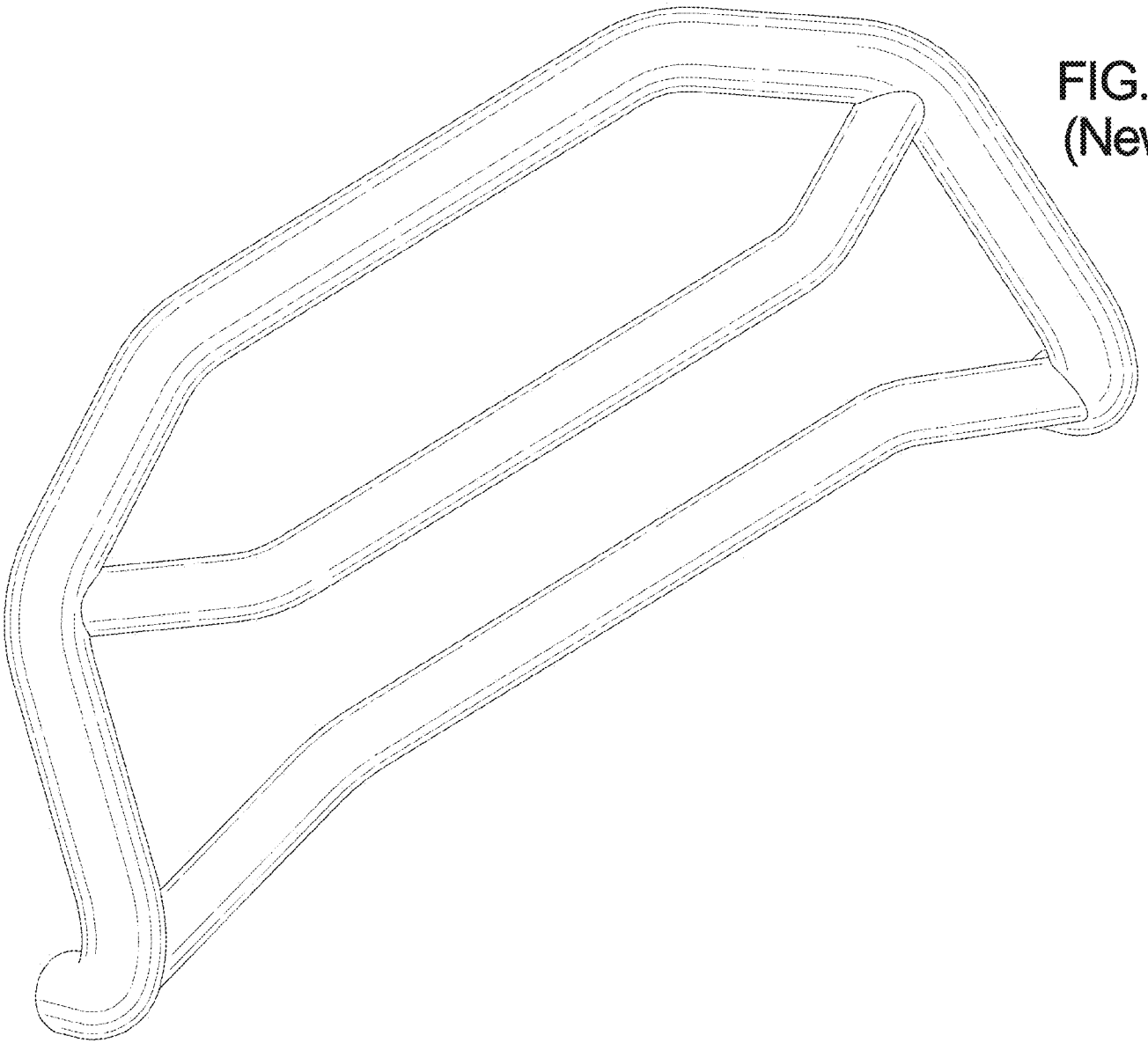

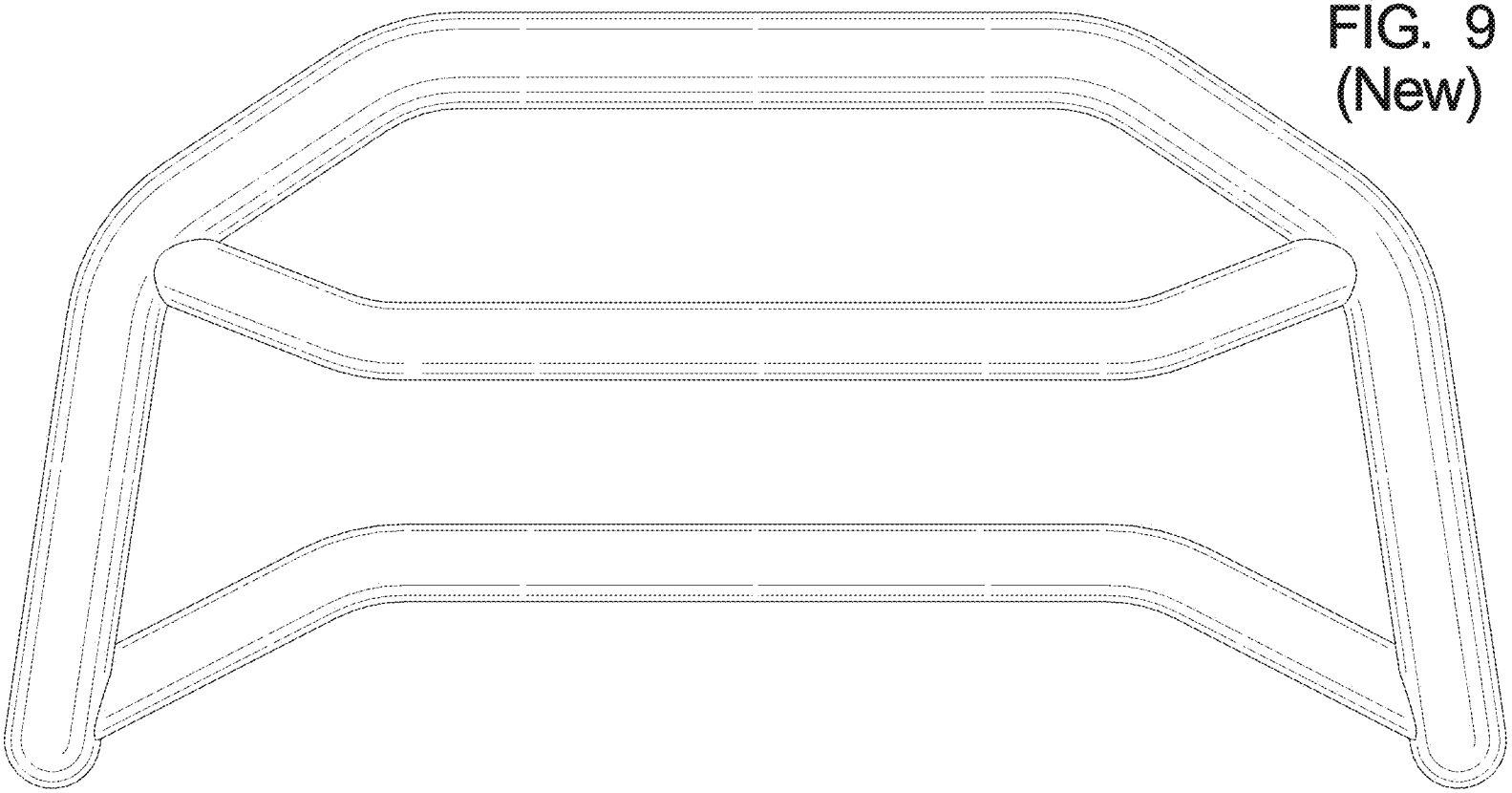
FIG. 9
(New)

FIG. 11
(New)
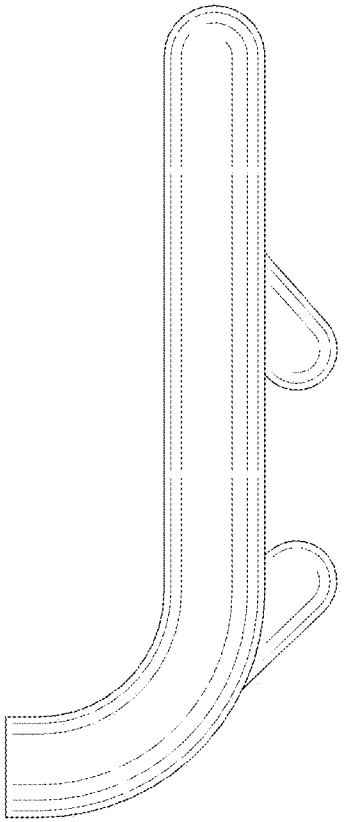
FIG. 10
(New)
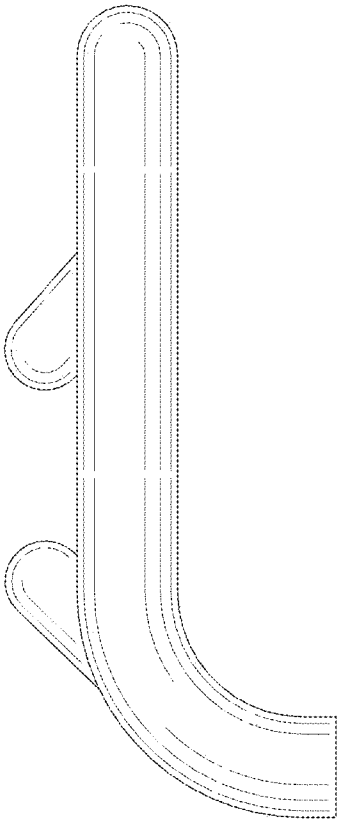

FIG. 12
(New)
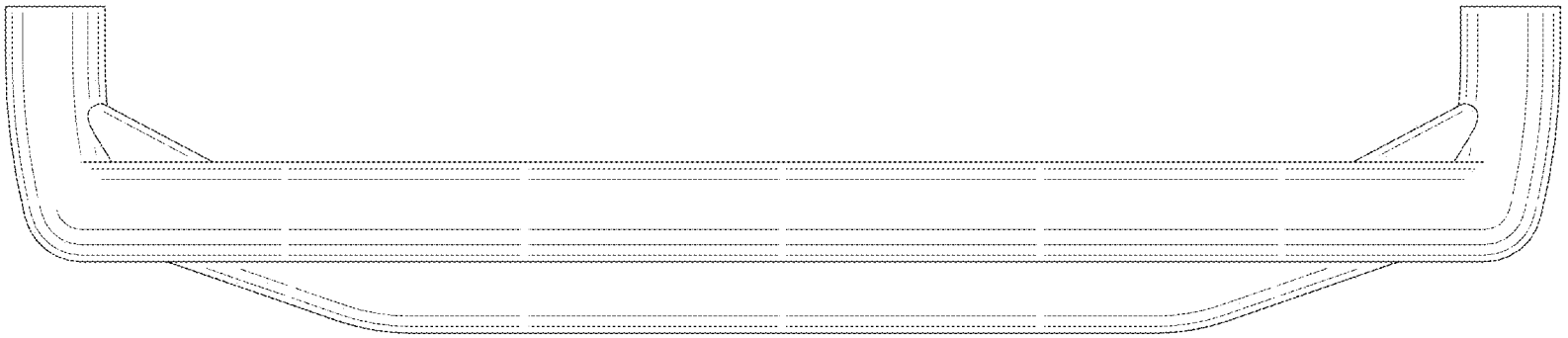
FIG. 13
(New)
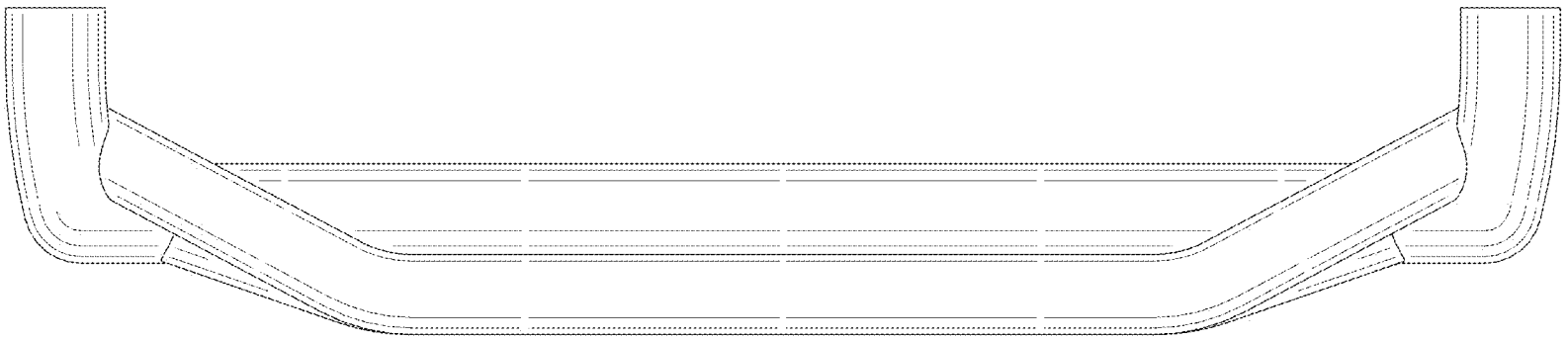

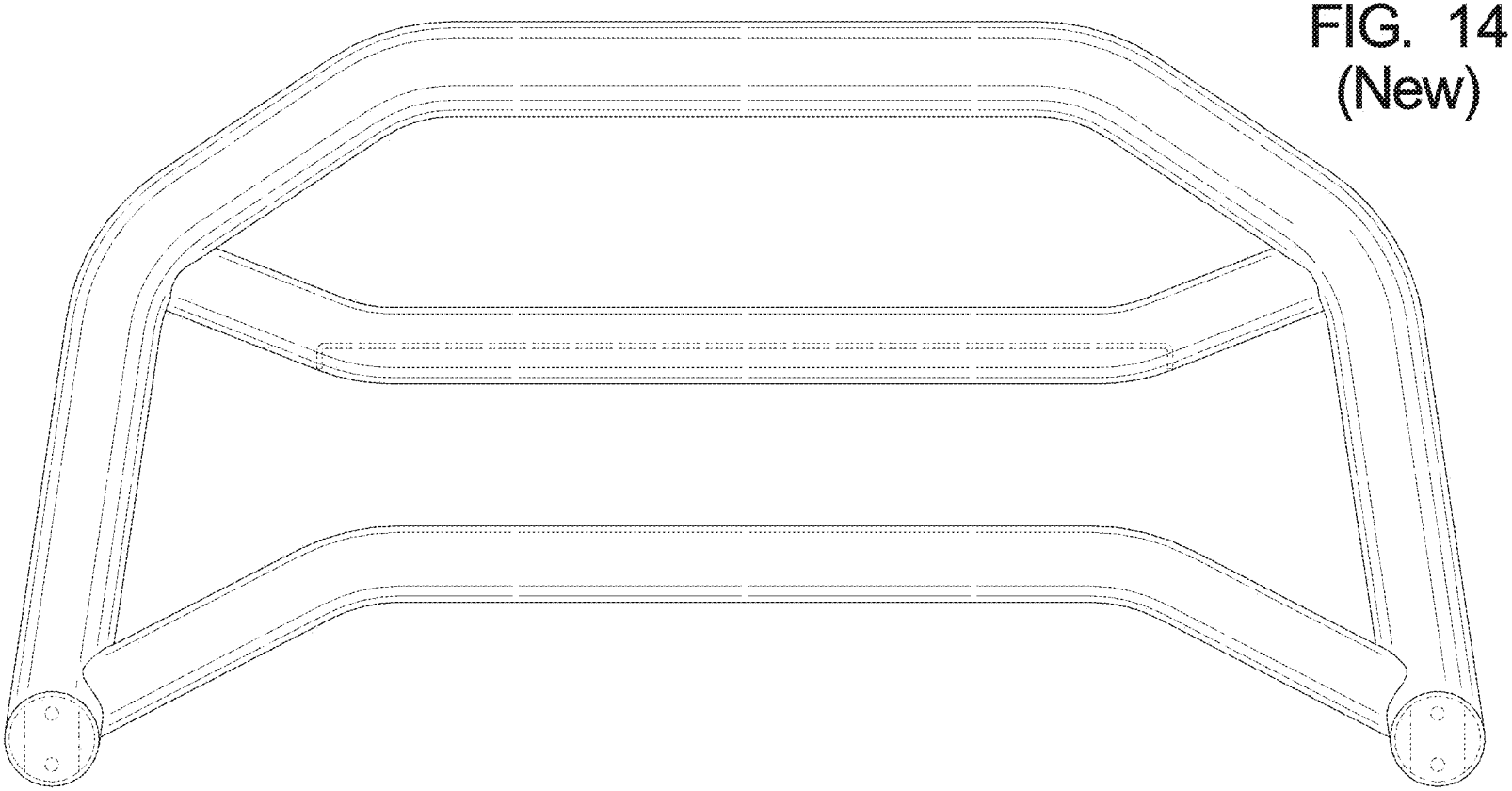
FIG. 14
(New)